(12) United States Patent
Goltz

(10) Patent No.: US 8,770,417 B2
(45) Date of Patent: Jul. 8, 2014

(54) STORAGE PRODUCT CARRIER FOR SLEEVE-SHAPED STORAGE PRODUCTS, AND STORAGE RACK THEREFOR

(75) Inventor: Mathias Goltz, Massenbachhausen (DE)

(73) Assignee: Hänel & Co., Alstätten (CH)

( * ) Notice: Subject to any disclaimer, the term of this patent is extended or adjusted under 35 U.S.C. 154(b) by 279 days.

(21) Appl. No.: 12/740,137

(22) PCT Filed: Oct. 28, 2008

(86) PCT No.: PCT/EP2008/064603
§ 371 (c)(1),
(2), (4) Date: Jun. 9, 2010

(87) PCT Pub. No.: WO2009/062844
PCT Pub. Date: May 22, 2009

(65) Prior Publication Data
US 2010/0258514 A1      Oct. 14, 2010

(30) Foreign Application Priority Data

Nov. 16, 2007   (DE) .................... 20 2007 016 061 U

(51) Int. Cl.
*A47F 7/00*     (2006.01)

(52) U.S. Cl.
USPC .......................... 211/13.1; 211/134; 211/193

(58) Field of Classification Search
USPC .............. 211/59.1, 85.5, 134, 193, 13.1;
248/68.1 X, 56, 74.4, 231.61; 403/235,
403/237; 414/277, 282, 910, 911, 331.13,
414/331.14, 456, 575, 605; 242/399, 388.6,
242/401; 198/431, 435, 456
See application file for complete search history.

(56) References Cited

U.S. PATENT DOCUMENTS

| 806,192 | A | * | 12/1905 | Russell ........................... 248/59 |
| 1,262,763 | A | * | 4/1918 | Farley ............................. 248/62 |
| 1,315,225 | A | * | 9/1919 | Hughes ........................ 248/68.1 |
| 2,813,692 | A | * | 11/1957 | Peterson et al. ................ 248/56 |
| 3,388,806 | A | * | 6/1968 | Cunningham, Jr. et al. . 211/85.5 |
| 4,268,207 | A |   | 5/1981 | Pipes |
| 4,555,215 | A | * | 11/1985 | Raasch et al. ................. 414/564 |
| 4,634,333 | A | * | 1/1987 | Butterly et al. .......... 414/331.07 |

(Continued)

FOREIGN PATENT DOCUMENTS

| EP | 0310159 B1 | 4/1984 |
| EP | 0722894 A1 | 7/1996 |

OTHER PUBLICATIONS

International Search Report, PCT/EP2008/064603, Feb. 5, 2009, 3 pages.

*Primary Examiner* — Korie H Chan
(74) *Attorney, Agent, or Firm* — Brian B. Shaw, Esq.; Thomas B. Ryan; Harter Secrest & Emery LLP

(57) ABSTRACT

The invention relates to a storage product carrier for a storage shelf having a plurality of carrier supports placed one above the other and at a distance from each other, which are disposed in pairs on opposite side walls of the storage shelf and which support the storage product carrier, comprising a base body that is surrounded by an edge wall. The storage product carrier has a support wall, which protrudes from the base body. Carrier arms are provided on the support wall, which protrude from the support wall, and on which sleeve-shaped storage products (36), particularly roller bushings, can be deposited.

19 Claims, 4 Drawing Sheets

(56) References Cited

U.S. PATENT DOCUMENTS

| | | | |
|---|---|---|---|
| 4,842,227 A * | 6/1989 | Harrington et al. | 248/56 |
| 5,224,812 A * | 7/1993 | Oslin et al. | 414/401 |
| 5,595,311 A * | 1/1997 | Allen | 211/151 |
| 5,688,098 A | 11/1997 | Theno | |
| 6,006,971 A * | 12/1999 | Coleman et al. | 224/404 |
| 6,116,292 A * | 9/2000 | Vermeulen | 139/97 |
| 6,435,355 B1 * | 8/2002 | Brown | 211/44 |
| 8,069,623 B2 * | 12/2011 | Colwell et al. | 52/220.8 |

* cited by examiner

STORAGE PRODUCT CARRIER FOR SLEEVE-SHAPED STORAGE PRODUCTS, AND STORAGE RACK THEREFOR

The invention relates to a storage product carrier for a storage rack having a plurality of carrier supports placed one above the other and at a distance from each other, which are disposed in pairs on opposite side walls of the storage rack and which support the storage product carrier, wherein the storage product carrier comprises a base body that is surrounded by an edge wall of the storage product carrier.

Such storage product carriers are used, in particular, for the storage of storage products in automated vertical lifts that include a transport apparatus for the storage product carriers. Since the storage products are disposed in the storage rack according to the height of the storage product, storage products of various sizes can be stored on the storage product carriers in a space-saving manner.

A storage rack in which such a storage product carrier is utilized, is shown in EP 0 722 894 A1. To support the storage product carriers, carrier supports are provided within this storage rack in side walls made of steel sheeting, which support the storage product carriers. Furthermore, it is provided to assign the storage spaces to the storage product carriers as a function of the height of the storage products. The utilization of the available storage space is thus optimized.

In the printing industry, in particular, the storage of printing plates in the form of sleeve rolls poses a problem. Such storage products have a sensitive surface and are susceptible to mechanical damage and deformation.

For the efficient storage of yarn reels it is suggested in EP 0 310 159 B1 that cantilever arms be provided on a storage rack, which are insertable in a central opening of the yarn reels. The cantilever arms are fixedly attached on the rack.

U.S. Pat. No. 5,688,098 discloses a similar rack wherein the cantilever arms are not fixedly attached on the rack but are removably hooked.

The invention is based on the object of developing a storage product carrier of the initially mentioned type in such a manner that sleeve-like storage products can be safely and firmly stored thereon.

To achieve this object, in a storage product carrier of the initially mentioned type, it is suggested that the storage product carrier comprise a support wall extending from the base body and that cantilever arms be provided on the support wall extending from the support wall, on which sleeve-like storage products, in particular sleeve rolls, can be disposed.

The storage product carrier according to the present invention has the advantage that storage products having a central opening through which a cantilever arm is passed, can be safely and firmly stored. The surface of the storage product does not come into contact with the storage product carrier. The storage product cannot slide off and cannot move.

Advantageous embodiments are the subject matter of the dependent claims.

Advantageously, the cantilever arms are inclined at an angle with respect to the base body, which can be between 0° and 5°, in particular. By these means it can be effectively prevented that storage product slides off the cantilever arms due to knocks or vibrations as they can occur, in particular, in automated storage racks.

The cantilever arms can be fixed on the support wall by means of an attachment element enclosing one end of the cantilever arms in a frictional engagement.

Advantageously, the attachment elements comprise metal clamps.

In an advantageous embodiment, a support bracket is provided for fixing the support wall to the base body and for defining an angle between the support wall and the base body. By these means the entire structure is stabilized.

The angle between the support wall and the base body can be between 85° and 90°.

The support bracket can be attached to the base body both on a cantilever arm side of the support wall and on the opposite side of the support wall. This is how the stability of the structure, in particular during vibrations or knocks, is improved in a direction perpendicular to the support wall.

The cantilever arms are advantageously attached to the support wall in a releasable fashion so that damaged cantilever arms can be easily and cheaply exchanged.

In a further advantageous embodiment, cantilever arms of different cross-sectional shapes and sizes can be attached to the support wall. This increases the flexibility of use of the storage product carrier according to the present invention.

The cantilever arms extend from the support wall essentially at a right angle. Such a right angle is easily realized, which simplifies the structure of the storage product carrier.

In a further embodiment, the cantilever arms are of formed metal sheet. This has the advantage that the cantilever arms have a low weight, which increases the payload capacity of the storage product carrier.

In a further advantageous embodiment, the cantilever arms are made of tube sections. In particular, tube sections with a circular or ovoid cross-section have high stability in relation to their weight.

The attachment elements can comprise metal clamps. Metal clamps have a large contact surface so that the pressure of attachment is evenly distributed over the surface of the cantilever arms. The cantilever arms can thus bear a greater load.

Advantageously, attachment flanges having attachment openings for connecting the attachment elements to the support wall are provided on the support wall. Such attachment flanges can be fixed simply and cheaply on the support wall and offer the possibility of achieving a safe frictional connection of the support wall with the attachment elements using only few attachment openings through which attachment means are inserted.

In a further advantageous embodiment, two symmetrically arranged metal clamps fixed on the attachment flanges are provided for the attachment of each cantilever arm, which are fixed on the attachment openings by means of attachment means. If the metal clamps are tightened, they adapt to the shape of the surface of the cantilever arm that they embrace and thus achieve a pressure distribution which is particularly even.

The support wall can have a carrying plate with openings for the insertion of the cantilever arms. This carrying plate reinforces the structure of the support wall and thus results in improved stability.

The edges of the carrying plate can be bent and form an edge flange. Such an edge flange reinforces the carrying plate at its edge areas and thus further increases the stability of the storage product carrier. In a further advantageous embodiment, the support wall has reinforcing webs for increasing, in particular, the torsional stability of the support wall.

The attachment flanges in an advantageous embodiment, are arranged in the area of the reinforcing webs. Since the support wall is particularly stable in the area of the reinforcing webs, a particularly stable attachment of the cantilever arms by means of the attachment flanges can be achieved in this area.

The support wall advantageously comprises a damping element in the area of the cantilever arms. This is to prevent direct contact between the storage product and the support wall.

The present invention also comprises a storage rack for the storage product carrier.

The invention will be explained in the following in more detail with reference to an exemplary embodiment schematically shown in the accompanying drawings, wherein.

Figure 1:
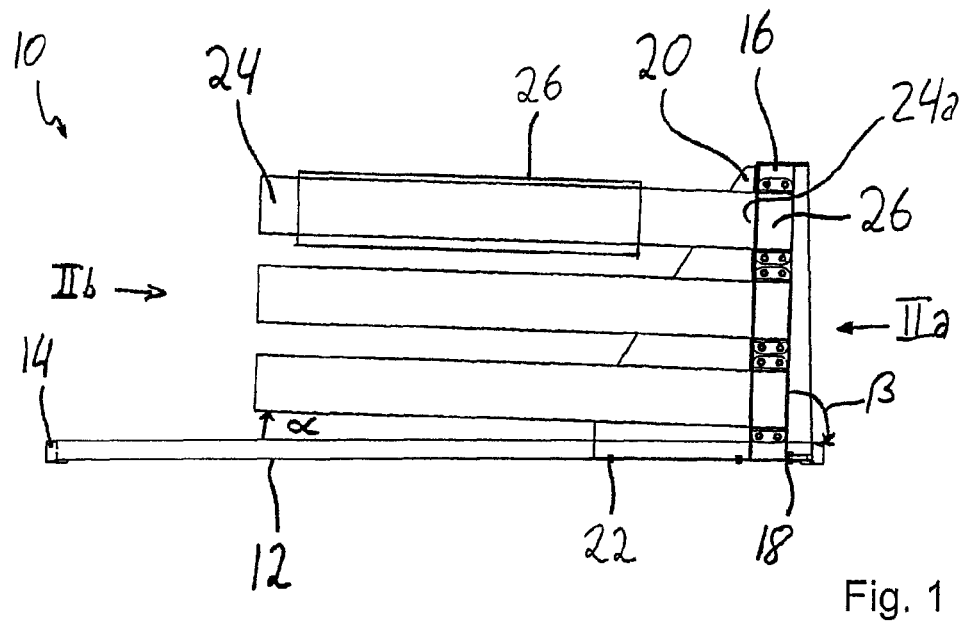
FIG. 1 is a side elevational view of a storage product carrier according to the present invention.

The storage product carrier 10 shown in FIG. 1 has a base body 12 surrounded by an edge wall 14. A support wall 16 extends from base body 12 at an angle β. For propping and stabilizing support wall 16, a support bracket 20 is provided, which is fixed on base body 12 by means of screws 22.

Cantilever arms 24 are fixed on and extend from support wall 16, on which sleeve-like storage products 36, in particular sleeve rolls used in the printing industry, can be disposed. Cantilever arms 24 are mounted on support wall 16 in an essentially perpendicular relationship. To create an inclination of cantilever arms 24 at an angle α with respect to base body 12, support wall 16 is fixed on support bracket 20 in such a way that support wall 16 is inclined with respect to the normal. This results in an angle α of about 1.6° between base body 12 and cantilever arms 24.

Figure 2A:
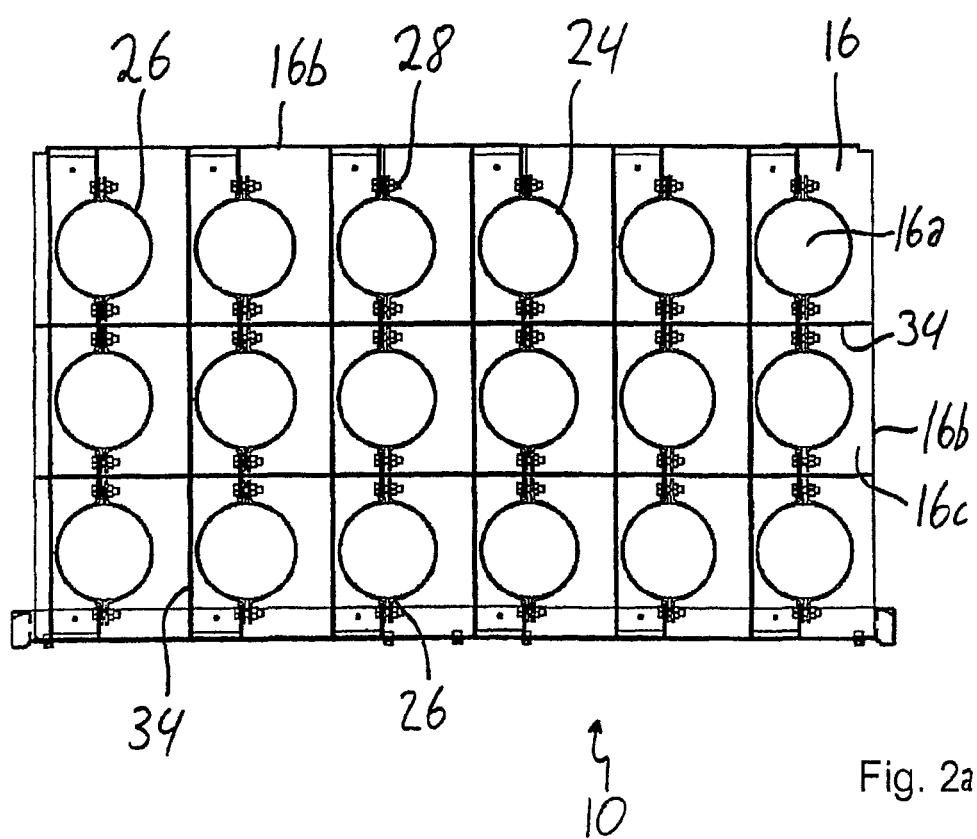
FIG. 2a is a view as seen in the direction of arrow IIa in FIG. 1.

As can be seen from FIG. 2a, storage product carrier 10 has 18 cantilever arms 24 arranged in three rows one above the other and in a spaced relationship. Cantilever arms 24 are attached to support wall 16 by means of attachment elements 26. Attachment elements 26 are formed by semicircular clamps. Two attachment elements 26 embrace an attachment end 24a of each cantilever arm 24. Attachment elements 26 are connected by means of screws 28 in positive engagement.

Figure 3:
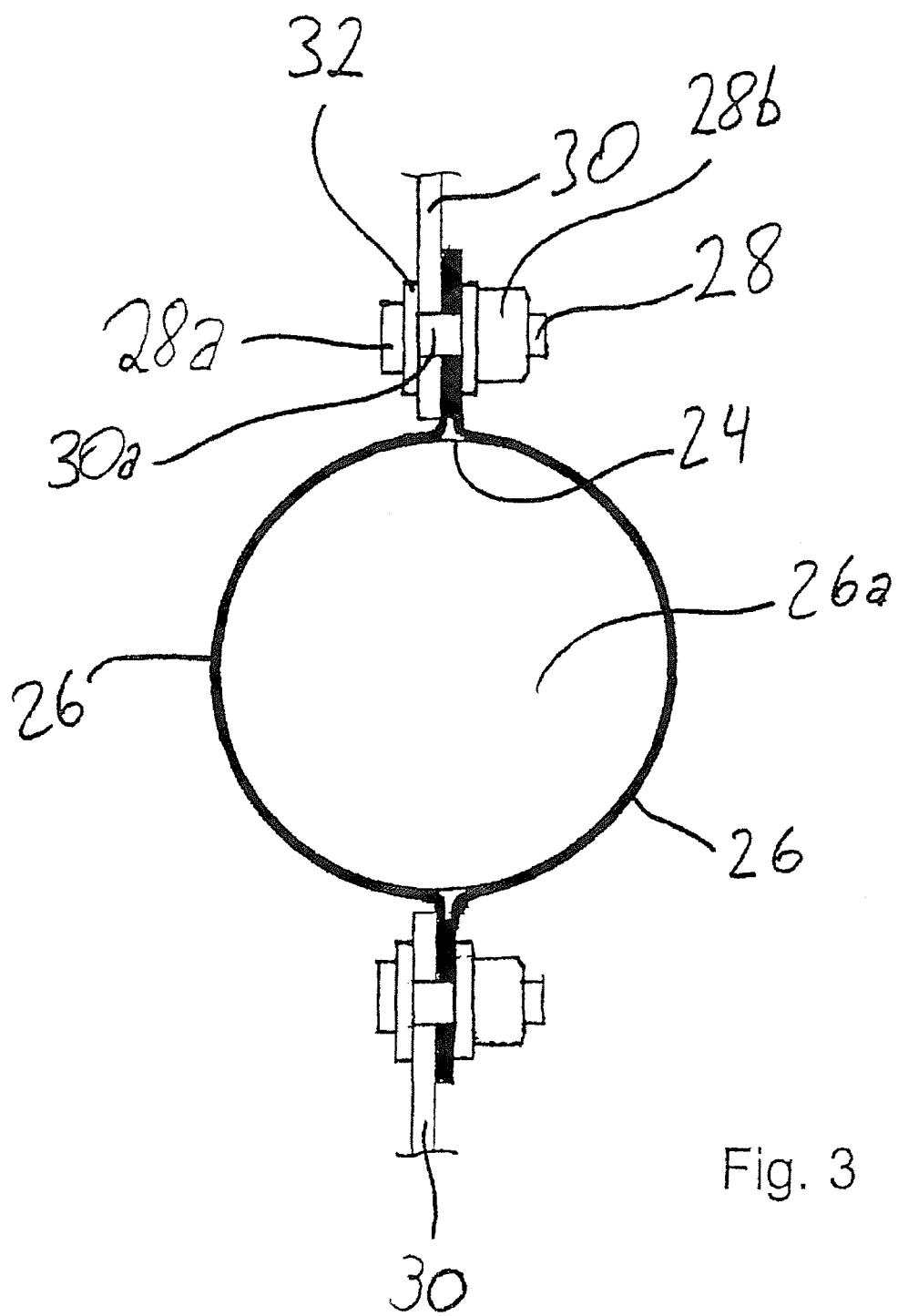
FIG. 3 is a cross-sectional view of the attachment elements on a cantilever arm.

FIG. 3 shows the attachment of cantilever arms 24 on support wall 16. The attachment of cantilever arm 24 by means of attachment elements 26 on support wall 16 is achieved on attachment flanges 30, which are fixed to support wall 16, for example, are welded to support wall 16. Attachment flanges 30 have attachment openings 30a for the attachment of attachment elements 26. To achieve an improved distribution of forces, washers 32 are arranged between a head 28a of screw 28 and attachment flange 30 and between a nut 28b and attachment element 26.

To mount cantilever arms 24, first, a receiving opening 26a is formed of two attachment elements 26 placed against each other in mirror image for each cantilever arm 24. In this configuration, attachment elements 26 are attached on attachment flange 30 with the aid of screw 28 and nut 28b initially in a loose fit. Subsequently, cantilever arm 24 is inserted with its attachment end 24a into receiving opening 26a. Finally, screw 28 is tightened and thus attachment elements 26 are tightened around attachment end 24a.

Since attachment elements 26 are flexible in their form, they adapt to the form of attachment ends 24a, which results in a large contact area for the transmission of force from cantilever arm 24 to attachment elements 26.

Depending on the form and size of the storage product to be stored, the diameter and the shape of the cantilever arms 24 may be varied. Attachment elements 26 must then be correspondingly adapted in their cross-section.

Support wall 16 is essentially comprised of a carrying plate 16c, in which circular openings 16a are provided for inserting cantilever arms 24. To increase the stability of support wall 16, edges 16b of carrying plate 16c are bent and form an edge fold. This primarily increases the stability in the edge area of support wall 16.

Furthermore, reinforcing webs 34 are provided, which are in frictional engagement with support wall 16 and support the latter.

Storage product carriers 10 are provided, in particular, for receiving storage products 36 in the form of sleeve rolls in the printing industry. The storage of such sleeve rolls 36 requires certain preconditions to be met by the storage product carrier 10. For example, the sleeve rolls 36 must be stored in such a manner that their surface is not damaged. Furthermore, care should be taken that they are not deformed when exposed to knocks or similar mechanical force.

Since the sleeve rolls are often formed of a plastic tube having an embossing rubber attached to its outer surface, which is easily damaged, it is preferred that the outer surface of the sleeve rolls be stored in a contact-free manner.

In this embodiment of storage product carrier 10, cantilever arms 24 are elongate, tube-shaped metal arms having a circular cross-section. The sleeve rolls 36 are slid onto these cantilever arms 24 which are arranged on support wall 16 in a spaced relationship.

The form of cantilever arms 24 is adapted to the form of the inner surface of sleeve rolls 36 so that cantilever arms 24 support sleeve rolls 36 from within. Deformation of sleeve rolls 36 is thus avoided should a mechanical force be inadvertently applied.

The spacing of cantilever arms 24 also results in the stored sleeve rolls 36 being spaced with respect to each other. It is thus no longer possible for the sleeve rolls 36 to touch when stored and thus damage each others' surfaces.

Vibrations and knocks are caused during storage of storage product carrier 10 due to the usual operation of storage rack 40. Sleeve rolls 36 stored on cantilever arms 24 can slide off cantilever arms 24 and fall off due to these vibrations. To counter this effect, cantilever arms 24 have an inclination toward support wall 16.

Figure 2B:
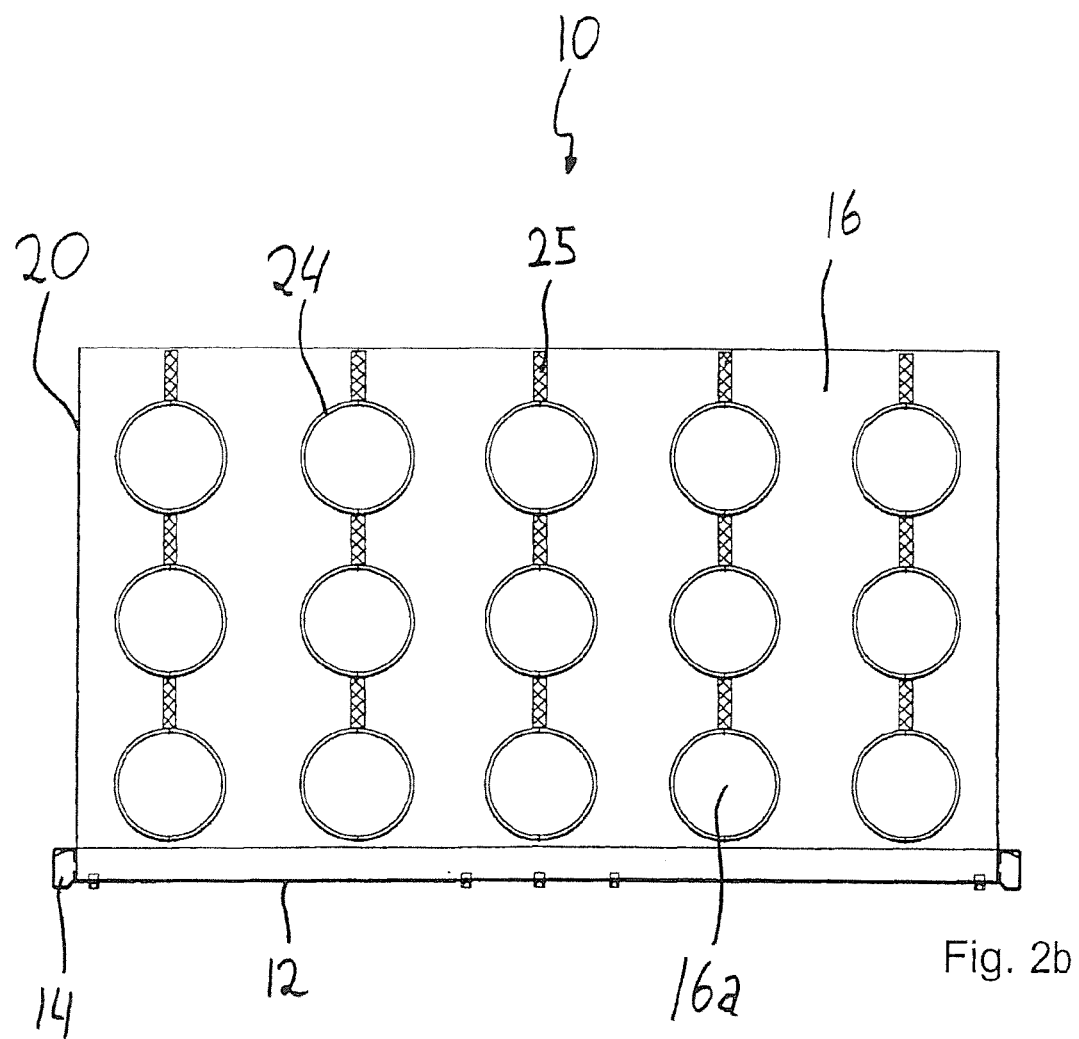
FIG. 2b is a view as seen in the direction of arrow IIb in FIG. 1.

A damping element 25 is fixed to support wall 16, as shown in FIG. 2b, so that sleeve rolls 36 are not damaged by coming into contact with support wall 16. Damping elements 25 of microcellular rubber prevent direct contact between sleeve rolls 36 and support wall 16. An undamped impact of sleeve rolls 36 on support wall 16, such as could arise, for example, during loading of cantilever arms 24, is thus effectively avoided.

Figure 4:
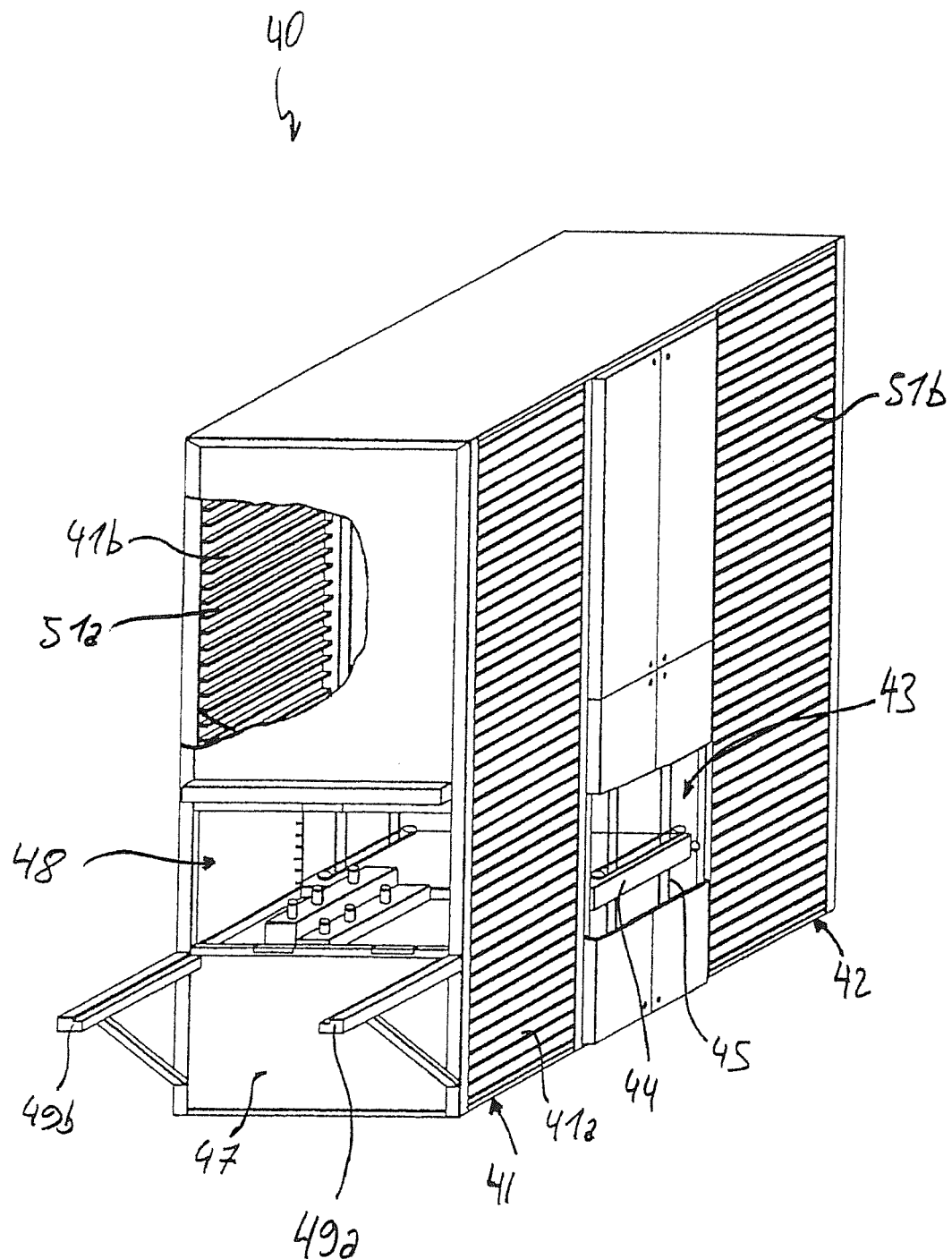
FIG. 4 is a perspective view of a storage rack able to receive a storage product carrier according to the present embodiment.

An exemplary embodiment of a storage rack 40, in which the above described storage product carrier 10 is used, is shown in FIG. 4.

Storage rack 40 has two rack areas 41, 42 arranged in a spaced relationship. A transport apparatus 43 is provided between the two rack areas 41, 42, which is configured as a platform 44 driven by chains 45. Rack areas 41, 42 each have side walls 41a, 41b parallel to each other.

At an end face 47 of rack area 41 there is a supply and retrieval opening 48 by means of which storage rack 40 is supplied with storage product carriers 10 and by which storage product carrier 10 and/or storage product 30 stored on it can be retrieved.

Side walls 41a, 41b of rack areas 41, 42 are of steel sheet in the embodiment shown, in which carrier supports 51a, 51b are pressed to face inwardly. Carrier supports 51a, 51b serve as a carrier support for storage product carrier 10. The height of edge wall 14 is chosen such that a guiding effect is achieved by neighboring carrier supports 51a, 51b.

To store sleeve rolls 36 in storage rack 40, a storage product carrier 10 is placed in retrieval opening 48, or on support arms 49a, 49b. Sleeve rolls 36 to be stored are slipped over cantilever arms 24, and subsequently, storage product carrier 10 is pushed into retrieval opening 48 of storage rack 40. From there, storage product carrier 10 is automatically transported onto platform 44 of transport apparatus 43, which moves storage product carrier 10 to its storage position within storage rack 40. At the storage position, storage product carrier 10 is then pushed onto carrier supports 51a, 51b. Storage product carrier 10 enables the space-saving advantages of storage in storage rack 40 to be used for the storage of sleeve rolls 36. Furthermore, storage product carrier 10 allows the safe storage of sleeve rolls 36 with sensitive outer surfaces.

LIST OF REFERENCE NUMERALS 10 storage product carrier
12 base body
14 edge wall
16 support wall
16a opening
16b edge
16c carrying plate
18 screw connection
20 support bracket
22 screw
24 cantilever arm
24a attachment end
25 damping element
26 attachment element
26a receiving opening
28 screw
28a head
28b nut
30 attachment flange
30a attachment opening
32 washer
34 reinforcing web
36 storage product
40 storage rack
41 rack area
41a side wall
41b side wall
42 rack area
43 transport apparatus
44 platform
45 chains
47 end face
48 retrieval opening
49a support arm
49b support arm
51a carrier support
51b carrier support
α angle
β angle

The invention claimed is:

1. A storage product carrier for a storage rack, the storage product carrier comprising:
a base body surrounded by an edge wall,
a support wall that extends in a generally vertical direction from the base body and in a generally horizontal direction along the base body,
the edge wall protruding beyond the support wall in the horizontal direction, and
cantilever arms extending perpendicular from the support wall on which a sleeve-like storage product, in particular sleeve rolls, can be disposed, and
the support wall being inclined with respect to a normal from the base body such that the cantilever arms are inclined at an angle (α), which is greater than 0° and less than 5° with respect to the base body to prevent the sleeve-like storage product from sliding off the cantilever arms due to knocks or vibrations applied through the storage product carrier; wherein the cantilever arms are attached on the support wall by means of attachment elements that embrace one end of the cantilever arms in frictional engagement; and wherein the attachment elements are formed of metal clamps.

2. The storage product carrier according to claim 1, wherein attachment flanges with attachment openings for connecting the attachment elements to the support wall are provided on the support wall.

3. The storage product carrier according to claim 2 wherein, for the attachment of each cantilever arm two symmetrically-arranged metal clamp parts are provided on the attachment flanges, which are fixed on the attachment openings by means of elongate attachment means.

4. The storage product carrier according to claim 1, wherein a support bracket is provided for fixing the support wall on the base body.

5. The storage product carrier according to claim 4 in which the angle (β) between the support wall and the support base body is greater than 85° and less than 90°.

6. The storage product carrier according to claim 4, wherein the support bracket is fixed to the base body both on a cantilever-arm side of the support wall and on the opposite side.

7. The storage product carrier according claim 1, wherein the cantilever arms are attached to the support wall in a releasable fashion.

8. The storage product carrier according to claim 7, in which cantilever arms of various cross-sectional shapes and sizes are attachable on the support wall.

9. The storage product carrier according to claim 1 in which the cantilever arms extend from the support wall at essentially a right angle.

10. The storage product carrier according to claim 1, wherein the cantilever arms are made of one of formed metal sheet and tube sections.

11. The storage product carrier according to claim 1, wherein the attachment elements are made to be self-adapting to the shape of the cantilever arms.

12. The storage product carrier according to claim 1, wherein the support wall comprises a carrier plate with openings for the insertion of the cantilever arms.

13. The storage product carrier according to claim 12, in which the edges of the carrier plate are bent and form an edge flange.

14. The storage product carrier according to claim 12, in which the support wall comprises reinforcing webs.

15. The storage product carrier according to claim 2 wherein the support wall comprised reinforcing webs, wherein the attachment flanges are arranged in the area of the reinforcing webs.

16. The storage product carrier according to claim 1, wherein the support wall comprises a damping element in the area of the cantilever arms.

17. A storage rack comprising:
- a transport apparatus,
- a plurality of carrier supports spaced one above the other, arranged in pairs on opposite side walls of the storage rack, and
- the storage product carrier according to claim 1 being supported by one of the pairs of carrier supports.

18. The storage rack according to claim 17, wherein the transport apparatus is controllable for the storage product carrier between different pairs of carrier supports.

19. The storage rack of claim 17 in which the edge wall of the storage product carrier has a height that provides for guiding the storage product carrier between the pairs of carrier supports.

* * * * *